Patented Apr. 30, 1940

2,199,002

UNITED STATES PATENT OFFICE 2,199,002

TREATMENT OF RUBBER

Albert J. Laliberte, Naugatuck, Conn., assignor, by mesne assignments, to United States Rubber Company, New York, N. Y., a corporation of New Jersey No Drawing. Application May 18, 1937, Serial No. 143,297

3 Claims. (Cl. 260—793)

This invention relates to the vulcanization of rubber, and more particularly to the provision of new vulcanization catalysts.

The invention broadly comprises vulcanizing rubber in the presence of the tetra-amyl thiurammonosulphide accelerator as herein set forth. The amyl groups may be either an n-amyl group, or an iso-amyl group, or a technical mixture thereof.

The following example is given to illustrate a preferred mode of the invention relative to the monosulphides.

Example 1

15.6 pounds of caustic soda (about 95% NaOH) are dissolved in 234 pounds of water; then 60 pounds of diamylamine are added. The mixture is next brought to 30° C., and 29.4 pounds of carbon disulphide are added with agitation at such a rate that a reaction temperature of 30–40° C. is maintained. The aqueous solution of sodium diamyl dithiocarbamate, is diluted with 300 pounds of water and treated with 22 pounds of phosgene at 35–40° C. over 3 to 4 hours' time in a well agitated, ventilated vessel. The gaseous by-product consisting principally of carbon oxysulphide is allowed to escape to the atmosphere. The reaction is considered completed when a positive acid test is obtained with blue litmus paper. The slightly acid reaction mixture is agitated for an additional hour at 35–40° C. Then, 70 pounds of benzol are added to facilitate separation from water, and the diluted reaction product is washed with water to remove water-soluble chlorides. The benzol reaction mixture is then separated and distilled at 28–29 inches of vacuum with a final maximum temperature of 110° C. for the removal of benzol. It is desirable to avoid high temperatures during this distillation since the reaction product is heat-sensitive and yields dark colored materials of high viscosity at elevated temperatures of distillation.

Sixty-three (63) pounds of a reaction product are obtained, consisting substantially of tetra-amyl thiuram monosulphide, and showing the following average analytical results.

|  | Per cent |
| --- | --- |
| Total nitrogen | 6.7– 6.8 |
| Sulphur | 17.2–17.8 |

Instead of using benzol as a diluting agent to facilitate separation and washing, separation may be accomplished by means of a high-speed centrifuge. This procedure also yields a product of better color and lower viscosity.

Instead of sodium hydroxide, other alkali may be used to form a water soluble salt of N-diamyl dithiocarbamic acid to be reacted with the phosgene, the salt portion being eliminated as the chloride.

While the above reactions can be carried out in ordinary iron equipment, it is best to use acid resistant material, such as glass, enameled steel, stainless-steel or Monel, in order to prevent discoloration of the end product due to the contamination with heavy metals.

Whereas the material may be purified to remove the ingredients associated with the tetra-amyl thiurammonosulphide, which constitutes a preponderant amount of the final product, it has been found that the unpurified material as herein prepared works best for the purpose. The associated ingredients are believed to include small amounts of corresponding amylated thiourea and amylated urea. The unpurified material is a stronger accelerating agent than the monosulphide per se at ordinary vulcanizing temperatures and shows less tendency to cure by "scorch" at the lower temperatures of processing.

When tested in rubber the tetra-amyl thiuram-monosulphide material shows the following results:

|  | Stock, parts by weight | | |
| --- | --- | --- | --- |
|  | A (control) | B | C |
| Smoked sheet | 100 | 100 | 100 |
| Zinc oxide | 10 | 10 | 10 |
| Zinc soap of cocoanut oil acids | 3 | 3 | 3 |
| Sulphur | 3 | 3 | 3 |
| Above reaction product of phosgene and diamyl dithiocarbamate | | 0.40 | 0.60 |

|  | Ultimate tensile in pounds per square inch | | |
| --- | --- | --- | --- |
|  | A (control) | B | C |
| Minutes of cure in press at 274° F.— | | | |
| 10 | 0 | 0 | 0 |
| 20 | 0 | 4200 | 4750 |
| 30 | 0 | 4300 | 4600 |
| 45 | 50 | 4200 | 4350 |
| 60 | 140 | 3800 | 3800 |

The data illustrates a very valuable characteristic, namely, delayed action together with very fast acceleration after it starts. This makes it possible to use such an accelerator in manufacturing operations without trouble from pre-cure yet giving the advantage of very short curing times at normal vulcanizing temperatures. In this respect there is a difference from the corresponding short carbon chain thiuram sulphide accelerator.

Rubber as herein used is to be construed broadly as including caoutchouc, balata, gutta percha, synthetic rubbers, and plastics such as Neoprene (poly-chloroprene) and Thiokol (olefine polysulphide), whether or not it is in the solid form or in the form of an aqueous dispersion (natural or artificially-prepared) and whether compounded or not with suitable fillers, anti-oxidants, etc.

Having thus described my invention, what I claim and desire to protect by Letters Patent is:

1. A process which comprises vulcanizing rubber in the presence of an accelerating agent comprising tetra-amyl thiuram monosulphide, an amyl thiourea and an amyl urea.

2. An accelerating agent comprising tetra-amyl thiurammonosulphide, an amyl thiourea, and an amyl urea.

3. A rubber composition containing prior to vulcanization an accelerating agent comprising tetra-amyl thiurammonosulphide, an amyl thiourea, and an amyl urea.

ALBERT J. LALIBERTE.